United States Patent [19]

Obendorf et al.

[11] 3,925,412

[45] Dec. 9, 1975

[54] CYCLOAMIDINES

[75] Inventors: Werner Obendorf; Irmgard Lindner; Ernst Schwarzinger; Josef Krieger, all of Linz (Danube), Austria

[73] Assignee: Oesterreichische Stickstoffwerk Aktiengesellschaft, Linz (Danube), Austria

[22] Filed: July 20, 1793

[21] Appl. No.: 381,336

[30] Foreign Application Priority Data

July 21, 1972 Germany............................ 2235915

[52] U.S. Cl. .......................................... 260/326.47
[51] Int. Cl.² ...................................... C07D 207/12
[58] Field of Search ................... 260/326.3, 326.47

[56] References Cited
UNITED STATES PATENTS

| 3,609,147 | 9/1971 | Ackerman | 260/326.37 |
|---|---|---|---|
| 3,666,760 | 5/1972 | Ackerman | 260/326.37 |
| 3,812,151 | 5/1974 | Pfeiffer et al. | 260/326.47 |

Primary Examiner—Elbert L. Roberts
Attorney, Agent, or Firm—Wenderoth, Lind & Ponack

[57] ABSTRACT

A cyclic amidine having the general formula:

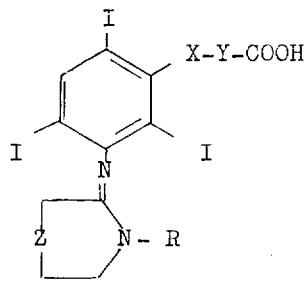

in which X is a single carbon-carbon bond or the $-CO-N{\overset{R_1}{\underset{}{<}}}$ group, Y is a straight-chain or branched alkylene group containing up to four carbon atoms, Z is a single bond or an ethylene group and R and $R_1$, which may be the same or different, each is a hydrogen atom, an alkyl or alkenyl group containing up to four carbon atoms, a hydroxyalkyl group containing up to four carbon atoms, an alkoxyalkyl group containing up to six carbon atoms or a cyclohexyl, benzyl or phenyl group, and the lower alkyl esters and pharmaceutically acceptable salts thereof with inorganic or organic bases or acids, and the preparation thereof.

12 Claims, No Drawings

CYCLOAMIDINES

The present invention relates to cyclic amidines and to a process for the preparation thereof.

More particularly, the present invention provides a cyclic amidine having the general formula:

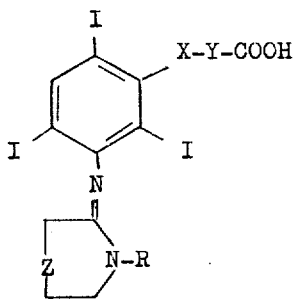
(I)

in which X is a single carbon-carbon bond or the

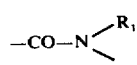

group, Y is a straight-chain or branched alkylene group containing up to four carbon atoms, Z is a single bond or an ethylene group and R and $R_1$, which may be the same or different, each is a hydrogen atom, an alkyl or alkenyl group containing up to four carbon atoms, a hydroxyalkyl group containing up to four carbon atoms, an alkoxyalkyl group containing up to six carbon atoms or a cyclohexyl, benzyl or phenyl group, and the lower alkyl esters and pharmaceutically acceptable salts thereof.

Since the compounds of the above formula (I) are amphoteric, salts are to be understood as both salts with acids and salts with bases, and such acids or bases may be organic or inorganic in nature.

Particularly preferred compounds of the formula (I) are those in which Y is a methylene, ethylene, α-methylethylene or α-ethylethylene group, R is a methyl, benzyl, cyclohexyl, β-methoxyethyl, γ-methoxypropyl, β-hydroxyethyl or phenyl group and $R_1$ is a methyl, ethyl, propyl, allyl or γ-methoxypropyl group, and X is the group

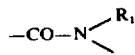

and Z is a single bond.

Further compounds to be mentioned are those in which, in the formula (I), X and Z is each a single bond and Y together with the carboxyl group is a propionic acid group, α-methylpropionic acid group or α-ethylpropionic acid group.

The compounds of the formula (I) are X-ray contrast agents which are preferentially eliminated through the bile. They are distinguished by low toxicity and rapid elimination from the body and show a surprisingly low bonding to protein, which is to be regarded as an index of rapid and easy elimination from the body. The compounds include both examples which may be used as intravenous contrast agents and examples which may be administered orally, with the latter to be regarded as so-called rapid cholecystography agents, that is to say agents which after five hours have already been very largely eliminated and therefore permit administration and investigation on one and the same day.

Intravenous bile contrast agents of the formula (I) are particularly those compounds of the formula (I), wherein X is

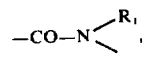

and in which $R_1$ is a hydrogen atom and the group R carries a hydroxyl group, and amongst these the compound N-[3-(1'-β'-hydroxyethylpyrrolidinylidene-(2')-amino)-2,4,6-triiodobenzoyl]-β-amino-α-methylpropionic acid and the salts thereof are particularly preferred.

The remaining compounds, including those in which X is a single bond, are X-ray contrast agents for oral administration. Thus, for example, the compound N-[3-(1'-γ-methoxypropyl-pyrrolidinylidene-(2')-amino)-2,4,6-triiodobenzoyl]-N-γ-methoxy-propyl-β-aminopropionic acid, which has an intravenous toxicity of 1.38 g/kg and shows no bonding to protein, has been eliminated through the bile to the extent of 91 percent (of the administered material), after 5 hours. Similarly favourable values are shown, for example, by the compounds N-[3-(1'-β-methoxyethyl-pyrrolidinylidene(-2')amino)-2,4,6-triiodobenzoyl]-β-aminopropionic acid, N-[3-(1'-γ'-methoxypropylpyrrolidinylidene(-2')amino)-2,4,6-triiodobenzoyl]-β-amino-α-methylpropionic acid, N-[3-(1'-γ'-methoxypropyl-pyrrolidinylidene(2')amino)-2,4,6-triiodobenzoyl]-N-γ-methoxypropyl-β-aminopropionic acid and N-[3-(1'-β'-hydroxyethyl-pyrrolidinylidene-(2')amino)-2,4,6-triiodobenzoyl]-N-allyl-β-aminopropionic acid.

The present invention also provides a process for the preparation of a compound of the formula (I), which comprises reacting an amino compound having the general formula:

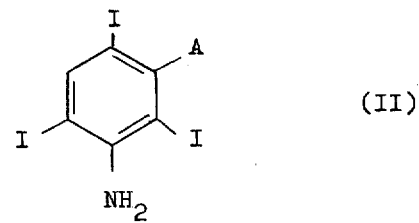
(II)

in which A represents the group COCl or the group —X—Y—COO— alkyl, in which X and Y are the same as defined in formula (I) and alkyl is a lower alkyl group, with a lactam having the general formula:

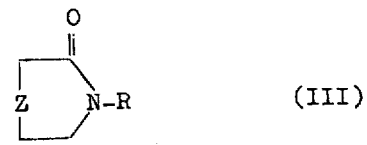
(III)

in which Z and R are as defined in formula (I), and with at least 1 mol of phosphorus oxychloride per mol of the compound of formula (II), with hydroxyl groups present both in R and in $R_1$ being protected, before the reaction, by easily saponifiable groups, preferably acyl radicals, and thereafter converting COCl groups present in the aromatic nucleus into the corresponding acid amides by treatment with an amine having the formula:

in which alkyl is a lower alkyl group and $R_1$ and Y are as defined in formula (I), and thereafter saponifying the saponifiable protective groups which are present, and, if desired, saponifying the ester group, and converting acid or basic groups which are present into salts, or liberating the acids or bases from such salts.

The reaction of the compounds of formula (II) with the lactams of formula (III) is appropriately carried out in a solvent. This may be either an inert organic solvent such as chloroform, dioxane, ether, ethyl acetate or toluene, or the reactant of formula (III), which must then be present in excess, may serve as the solvent, or, finally, excess $POCl_3$ may be used as the solvent. Appropriately, the reaction is accelerated by using an elevated temperature and preferably the reaction is carried out at the boiling point of the solvent. During this reaction stage, hydrogen chloride is evolved.

If the lactam of formula (III) contains a hydroxyl group, this must be protected before the reaction, since the group is not inert towards $POCl_3$. Equally, hydroxyl groups in the group $R_1$ must be protected, if X represents the

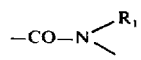

group. Any protective group which subsequently may be split off through acid or basic treatment is suitable. Acylation has proved the most appropriate method of protection.

If, A in the compound of formula (II) is an acid chloride group, the reaction with the lactam must be followed by the formation of the acid amide group. For this reaction it is appropriate to employ either the crude acid chloride hydrochloride or the base which is liberated by rendering the medium alkaline and is subsequently isolated. The reaction with the amine of formula (IV) is exothermic and may be completed by brief heating after the reaction has subsided.

Only after completion of all these reaction steps are the protective groups split off, and this splitting reaction may be coupled with the saponification of ester groups in the side chain of the molecule, where such groups are present and the ester does not represent the end product. However, the splitting off and saponification also may be carried out in succession, optionally in either sequence.

The free acids in most cases precipitate from the aqueous solutions in an adequately pure, but amorphous, form and show ill-defined and uncharacteristic melting points.

Where the compounds of formula (I) which are obtained are acids and not esters, they may be isolated as free acids or as salts. It is, however, also possible to isolate the compounds as salts of the amidine by treating the free base with a strong acid, for example a mineral acid.

Suitable salts of the compounds according to the invention are, in particular, sodium, lithium and ammonium salts, salts of the alkaline earth metals such as calcium, and salts of non-toxic organic bases such as glucosamine, methylglucosamine, ethanolamine, diethanolamine, glucamine and methylglucamine. The hydrochlorides, sulphates, acetates, fumarates, succinates and tartrates are examples of salts of the amidines, and also of the esters, which are used.

Because of the structure, isomerism can occur. The isomers may be separated and are also within the scope of the present invention.

For administration as intravenous bile contrast agents, the compounds according to the invention are best formulated as aqueous salt solutions to which polyvinyl-pyrrolidone may be optionally added. Possible salts are above all alkali metal salts, such as the sodium salt, and salts with organic bases, such as the methylglucamine salt.

Oral administration is possible in the form of tablets, suspensions, capsules or effervescent powders. Both the free acids of the compounds of formula (I) and salts with bases or acids may be used as the basis of the formulations, and in the latter case salts with organic acids have also proved of value.

3-Amino-2,4,6-triiodobenzoyl chloride used as the starting material, and the amides derived therefrom, which also may serve as the starting material, are known from German Pat. Nos. 1,117,135 and 1,085,648.

The preparation of compounds according to the invention, of formula (I), and compositions containing them are illustrated in the following Examples.

EXAMPLE 1

106.6 G. of 3-amino-2,4,6-triiodobenzoyl chloride are dissolved in chloroform and 100 ml. of N-methyl-pyrrolidone-(2) are added. 50 ml. of $POCl_3$ are added dropwise over the course of 20 minutes and the mixture is then boiled for 2 hours. The resulting crystals are filtered off and washed with chloroform. Thereafter they are suspended in ether and shaken with excess cold dilute aqueous sodium hydroxide solution until they have dissolved. The ether phase is then separated off, washed with water, dried over sodium sulphate and concentrated until crystallisation commences. The yield is 102.7 g. of 3-(1'-methyl-pyrrolidinylidene-(2')-amino)-2,4,6-triiodobenzoyl chloride, melting point: 111° to 112°C.

30.7 G. of this acid chloride are dissolved in chloroform, 14.4 g. of N-methyl-β-amino-α-methylpropionic acid methyl ester are added and after the exothermic reaction has subsided the mixture is boiled for 20 minutes under reflux. After cooling, the chloroform solution is washed with water and potassium bicarbonate solution, dried over sodium sulphate and evaporated. The evaporation residue is saponified by heating with 200 ml. of ethanol and 25 ml. of 4N sodium hydroxide and evaporated to dryness. The residue is dissolved in water, the calculated amount of glacial acetic acid is added and the precipitate is filtered off and dried in vacuo. 19.0 G. of N-[3-(1'-methyl-pyrrolidinylidene-(2')-amino)-2,4,6-triiodobenzoyl]-N-methyl-β-amino-α-methylpropionic acid of melting point: 130° to 142°C are obtained.

EXAMPLE 2

160.0 G. of 3-amino-2,4,6-triiodobenzoyl chloride are dissolved in chloroform, 77.0 g. of 1-(2'-acetoxyethyl)-pyrrolidone-(2) and 137.0 g. of $POCl_3$ are added and the mixture is boiled for approximately 5 hours; the crystals produced are filtered off cold and washed with chloroform. Yield, 163.0 g. of the hydrochloride of 3-[-1'-($\beta'$-acetoxyethyl)-pyrrolidinylidene-(2')-amino]-2,4,6-triiodobenzoyl chloride, melting point: 198° to 209°C.

28.9 G. of this hydrochloride are suspended in chloroform and dissolved by adding 30.0 g. of triethylamine, and 15.3 g. of $\beta$-aminopropionic acid ethyl ester are added. After the exothermic reaction has subsided, the mixture is heated for a further hour at the boiling point. After cooling, the solution is washed with water and dilute acetic acid, dried over sodium sulphate and evaporated. The evaporation residue is saponified by heating with excess 4N sodium hydroxide in methanol and is again evaporated to dryness. The residue is dissolved in water and acidified with glacial acetic acid, whereupon the end product initially precipitates as an oil and solidifies on treatment with water. It is purified by dissolving it in the calculated amount of dilute sodium hydroxide solution and precipitating it with acetic acid. 12.8 G. of amorphous N-[3-(1'-$\beta'$-hydroxyethyl-pyrrolidinylidene-(2')-amino)-2,4,6-triiodobenzoyl]-$\beta$-aminopropionic acid, melting point: 125° to 135°C, are obtained.

EXAMPLE 3

28.9 G. of the acid chloride hydrochloride described in Example 2 are suspended in chloroform and dissolved by adding triethylamine, and 11.7 g. of $\beta$-amino-$\alpha$-methylpropionic acid methyl ester are added, after which the mixture is boiled for about 30 minutes. After cooling, the chloroform solution is washed with water and dilute acetic acid, dried over sodium chloride and evaporated. The saponification of the ester group and the splitting off of the acetyl radical is brought about by heating with methanol and excess 4N sodium hydroxide. The evaporation residue is dissolved in water, the solution is clarified by filtration and the filtrate is acidified with glacial acetic acid. The initially oily precipitate solidifies on treatment with water and can be filtered off and dried in vacuo. 13.2 G. are obtained, whilst concentration of the precipitation mother liquor yields a further 5.1 g. of N-[3-(1'-$\beta'$-hydroxyethyl-pyrrolidinylidene-(2'')-amino)-2,4,6-triiodobenzoyl]-$\beta$-amino-$\alpha$-methylpropionic acid, melting point: 110° to 135°C.

EXAMPLE 4

53.3 G. of 3-amino-2,4,6-triiodobenzoyl chloride are dissolved in chloroform, 42.0 g. of 1-($\beta$-methoxyethyl)-pyrrolidone-(2) and 45.0 g. of $POCl_3$ are added and the solution is boiled for 6 hours. The resulting crystals are filtered off, washed with chloroform and dried. The yield is 62.0 g. of hydrochloride of 3-(1'-$\beta'$-methoxyethyl-pyrrolidinylidene-(2')-amino)-2,4,6-triiodobenzoyl chloride, melting point: 125° to 140°C, with decomposition.

41.64 G. of the acid chloride hydrochloride are suspended in chloroform and, after addition of 18.0 g. of triethylamine, are treated with 15.0 g. of $\beta$-aminopropionic acid ethyl ester. After the reaction has subsided, the mixture is further heated for 30 minutes and the reaction solution is then washed with water, dried overnight and evaporated. Saponification takes place by heating with methanol and excess 4N sodium hydroxide. After completion of the saponification, the solvent is distilled off and the evaporation residue is taken up in water; the resulting solution is clarified by filtration and then acidified with glacial acetic acid and the precipitate produced is filtered off and dried in vacuo. 29.8 G. of amorphous N-[3-(1'-$\beta'$-methoxyethyl-pyrrolidinylidene-(2')-amino-2,4,6-triiodobenzoyl]-$\beta$-aminopropionic acid are obtained, melting point: 97° to 109°C.

EXAMPLE 5

30.7 G. of N-(3-amino-2,4,6-triiodobenzoyl)-$\beta$-amino-$\alpha$-methylpropionic acid methyl ester are dissolved in chloroform, 14.3 g. of 2-methoxyethyl-pyrrolidone and 15.3 g. of $POCl_3$ are added and the mixture is boiled for 7 hours. After treating the chloroform solution with ice, cold, dilute NaOH and water, the aqueous phase is separated off and the chloroform phase is dried with sodium sulphate and evaporated to leave a residue. The latter is triturated with water, the water is filtered off and the filter residue is recrystallised from a mixture of methanol and dioxane. 27.3 G. of N-[3-(1'-$\beta'$-methoxyethyl-pyrrolidinylidene-(2')-amino)-2,4,6-triiodobenzoyl]-$\beta$-amino-$\alpha$-methylpropionic acid methyl ester are obtained, melting point: 184° to 185°C.

EXAMPLE 6

106.6 G. of 3-amino-2,4,6-triiodobenzoyl chloride are dissolved in chloroform, 44.0 g. of caprolactam and 90.0 g. of $POCl_3$ are added and the resulting mixture is boiled for 15 hours. The resulting crystals are then filtered off, washed with chloroform and dried. The yield is 59.1 g. of hydrochloride of 3'-cyclo-1'-azaheptylidene-(2')-amino-2,4,6-triiodobenzoyl chloride, melting point from 200°C. onwards, with decomposition.

21.98 G. of the acid chloride hydrochloride are suspended in chloroform and dissolved by adding triethylamine, 14.3 g. of N-allyl-$\beta$-aminopropionic acid methyl ester are added and the mixture is boiled for 30 minutes. Thereafter it is washed with water and dilute acetic acid, dried over sodium sulphate and evaporated. The evaporation residue is dissolved in methanol and saponified by boiling with excess 4N sodium hydroxide. After distilling off the solvent, the residue is dissolved in water, the solution is clarified by filtration and the free acid is precipitated with acetic acid. The free acid is filtered off, washed with water and dried in vacuo. The yield of N-[3-(cyclo-1'-azaheptylidene-(2')-amino)-2,4,6-triiodobenzoyl]-N-allyl-$\beta$-aminopropionic acid is 15.4 g., melting point: 132° to 145°C.

EXAMPLE 7

58.5 G. of $\beta$-(3-amino-2,4,6-triiodophenyl)-$\alpha$-ethylpropionic acid methyl ester are dissolved in chloroform, 20.0 g. of N-methylpyrrolidone-(2) and 30.6 g. of $POCl_3$ are added and the mixture is boiled for 8 hours. The solution is then poured into ice, washed with cold, dilute sodium hydroxide solution and water, dried over sodium sulphate and evaporated. The evaporation residue, 71.5 g. of a dark oil, is digested with water, the water is then decanted and the oily ester is saponified. For this purpose, it is dissolved in methanol, 84 ml. of a 2.4N solution of sodium hydroxide in methanol are added and the mixture is boiled for 2 hours. After distilling off the solvent, the residue is dissolved in water and adjusted to pH 5 with dilute hydrochloric acid. The precipitate is filtered off, washed with water and dried in vacuo. The yield is 57.6 g. of β-[3-(1'-methyl-pyrrolidinylidene-(2')-amino)-2,4,6-triiodophenyl]-α-ethylpropionic acid, melting point: 95° to 115°C.

On treating the acid with warm 1N hydrochloric acid, the hydrochloride of the compound is obtained in the form of crystals. Melting point from 200°C. onwards, with decomposition.

EXAMPLE 8

6.5 G. of 3-(1'-methyl-pyrrolidinylidene-(2')-amino)-2,4,6-triiodobenzoyl chloride hydrochloride are suspended in 50 ml. of CHCl$_3$, 4.0 g. of β-amino-α-methylpropionic acid methyl ester are added and the mixture is heated under reflux for 30 minutes. After cooling the reaction mixture, the chloroform solution is washed with water and dilute sodium hydroxide solution and dried over sodium sulphate, and evaporated. The evaporation residue can be crystallised from methanol. Yield: 3.3 G. of N-[3-(1'-methyl-pyrrolidinylidene-(2')-amino)-2,4,6-triiodobenzoyl]-β-amino-α-methylpropionic acid methyl ester, melting point: 111° to 119°C.

The following compounds were prepared in an analogous manner:

N-[3-(1'-Methyl-pyrrolidinylidene-(2')-amino)-2,4,6-triiodobenzoyl]-N-allyl-aminopropionic acid, melting point: 112° to 115°C.

N-[3-(1'-Methyl-pyrrolidinylidene-(2')-amino)-2,4,6-triiodobenzoyl]-β-amino-α-methylpropionic acid, melting point: 142° to 145°C.

N-[3-(1'-Ethyl-pyrrolidinylidene-(2')-amino)-2,4,6-triiodobenzoyl]-β-amino-α-methylpropionic acid, melting point: 126° to 137°C.

N-[3-(1'-β'-Hydroxyethyl-pyrrolidinylidene-(2')-amino)-2,4,6-triiodobenzoyl]-N-isopropyl-β-aminopropionic acid, melting point: 120° to 133°C.

N-[3-(1'-β'-Hydroxyethyl-pyrrolidinylidene-(2')-amino)-2,4,6-triiodobenzoyl]-N-allyl-β-aminopropionic acid, melting point: 95° to 110°C.

N-[3-(1'-β'-Methoxyethyl-pyrrolidinylidene-(2')-amino)-2,4,6-triiodobenzoyl]-aminoacetic acid hydrochloride, melting point: 178° to 193°C.

N-[3-(1'-β'-Methoxyethyl-pyrrolidinylidene-(2')-amino)-2,4,6-triiodbenzoyl]-N-methyl-β-aminopropionic acid, melting point: 86° to 108°C.

N-[3-(1'-β'-Methoxyethyl-pyrrolidinylidene-(2')-amino)-2,4,6-triiodobenzoyl]-N-ethyl-β-aminopropionic acid, melting point: 90° to 100°C.

N-[3-(1'-β'-Methoxyethyl-pyrrolidinylidene-(2')-amino)-2,4,6-triiodobenzoyl]-N-allyl-β-aminopropionic acid, melting point: 78° to 90°C.

N-[3-(1'-β'-Methoxyethyl-pyrrolidinylidene-(2')-amino)-2,4,6-triiodobenzoyl]-β-amino-α-ethylpropionic acid, melting point: 94° to 100°C.

N-[3-(1'-γ'-Methoxypropyl-pyrrolidinylidene-(2')-amino)-2,4,6-triiodobenzoyl]-β-aminopropionic acid, melting point: 85° to 100°C.

N-[3-(1'-γ'-Methoxypropyl-pyrrolidinylidene-(2')-amino)-2,4,6-triiodobenzoyl]-N-allyl-β-aminopropionic acid, melting point: 70° to 80°C.

N-[3-(1'-γ'-Methoxypropyl-pyrrolidinylidene-(2')-amino)-2,4,6-triiodobenzoyl]-N-3'''-methoxypropyl-β-aminopropionic acid, melting point: 70° to 84°C.

N-[3-(1'-γ'-Methoxypropyl-pyrrolidinylidene-(2')-amino)-2,4,6-triiodobenzoyl]-β-amino-α-methylpropionic acid, melting point: 90° to 95°C.

N-[3-(1'-Cyclohexyl-pyrrolidinylidene-(2')-amino)-2,4,6-triiodobenzoyl]-β-amino-α-methylpropionic acid, melting point: 136° to 148°C.

N-[3-(1'-Phenyl-pyrrolidinylidene-(2')-amino)-2,4,6-triiodobenzoyl]-β-amino-α-methylpropionic acid, melting point: 133° to 145°C.

β-[3-(1'-Methyl-pyrrolidinylidene-(2')-amino)-2,4,6-triiodophenyl]-propionic acid, melting point: 105° to 110°C.

β-[3-(1'-β'-Hydroxyethyl-pyrrolidinylidene-(2')-amino-2,4,6-triiodophenyl]-propionic acid, melting point: 100° to 125°C.

β-[3-(1'-β'-Methoxyethyl-pyrrolidinylidene-(2')-amino)-2,4,6-triiodophenyl]-propionic acid, melting point: 70° to 77°C.

β-[3-(1'-β'-Methoxy-pyrrolidinylidene-(2')-amino)-2,4,6-triiodophenyl]-α-ethylpropionic acid, melting point: 65° to 90°C.

β-[3-(1'-β'-Hydroxyethyl-pyrrolidinylidene-(2')-amino-2,4,6-triiodophenyl]-α-ethylpropionic acid, melting point: 102° to 115°C.

The acids may be converted, by treatment with aqueous alkali metal hydroxide solutions or solutions of organic amines, into the corresponding salts, which are obtained as an amorphous mass after evaporation or may be crystallised from suitable solvents such as water or ethanol.

For example, the crystalline sodium salt of N-[3-(1'-phenyl-pyrrolidinylidene-(2')-amino)-2,4,6-triiodobenzoyl]-β-amino-α-methylpropionic acid, of melting point 200° to 215°C, may be obtained from absolute ethanol.

The sodium salt of N-[3-(1'-ethyl-pyrrolidinylidene-(2')-amino)-2,4,6-triiodobenzoyl]-β-amino-α-methylpropionic acid crystallises from water and has a melting point of 190° to 200°C.

EXAMPLE 9

711.1 G. of N-[3-(1'-β-hydroxyethyl-pyrrolidinylidene-(2')-amino-2,4,6-triiodobenzoyl]-β-amino-α-methylpropionic acid are dissolved in 1,000 ml. of 1N sodium hydroxide and the resulting solution of the sodium salt is made up to 1,777.5 ml. with water. The clear solution contains 40 g. of active compound per 100 ml. of solution.

EXAMPLE 10

697.0 G. of N-[3-(1'-β-hydroxyethyl-pyrrolidinylidene-(2')-amino-2,4,6-triiodobenzoyl]-β-aminopropionic acid are dissolved in a little water, with addition of 193.2 g. of N-methyl-D-glucosamine, and the mixture is diluted to 2,788 ml. to give a solution with a content of D-glucosamine salt corresponding to 25 g. of free acid per 100 ml. of solution.

EXAMPLE 11

824.8 G. of the sodium salt of the acid mentioned in Example 9 are dissolved in water, 20.0 g. of polyvinylpyrrolidone are dissolved in the concentrated solution, and the whole is then made up to 2,000 ml. An injection solution containing 40 g., calculated as free acid, per 100 ml. is obtained.

In general, solutions may be prepared by dissolving the substance, present in the form of the acid, by means of the calculated amount of sodium hydroxide solution or N-methyl-D-glucosamine and doubly distilled water, adding polyvinylpyrrolidone if desired and diluting to the desired concentration. If the compounds of formula (I) are in the form of salts, they may be dissolved directly in doubly distilled water, with or without addition of polyvinylpyrrolidone. After clarifying by filtration, the solutions may be poured into ampoules and sterilised, and may be employed as injection solutions.

EXAMPLE 12

To produce tablets, 1.25 kg. of N-[3-(1'-β'-methoxyethyl)-pyrrolidinylidene-(2')-amino)-2,4,6-triiodobenzoyl]-β-aminopropionic acid are worked into a paste with gluten containing 25 g. of corn starch, and the paste is granulated. The dried granules are mixed with 125 g. of corn starch and 6 g. of magnesium stearate and the mixture is pressed to give tablets containing 500 mg. of active compound.

EXAMPLE 13

The readily soluble sodium salt of N-[3-(1'-γ'-methoxypropyl-pyrrolidinylidene-(2')-amino)-2,4,6-triiodobenzoyl]-β-aminopropionic acid, as a solid substance or in the form of a free-flowing paste with vegetable oils, is filled into gelatine capsules. The content of active compound per capsule is 500 mg.

EXAMPLE 14

A concentrated solution of the sodium salt of N-[3-(1'-β'-methoxyethyl-pyrrolidinylidene-(2')-amino)-2,4,6-triiodobenzoyl]-β-aminopropionic acid in polyethylene glycol 360 is filled into a quantity of gelatine capsules such that the resulting content of active compound per capsule is 500 mg.

EXAMPLE 15

To manufacture effervescent granules, 3 g. of the sodium salt of N-[3-(1'-ethyl-pyrrolidinylidene-(2')-amino)-2,4,6-triiodobenzoyl]-β-amino-α-methylpropionic acid, 3.375 g. of tartaric acid, 0.0122 g. of polyoxystearate (sic), 0.0122 g. of sodium laurylsulphonate, 3 g. of caster sugar and 2.65 g. of sodium carbonate are well mixed, moistened with alcohol and converted to granules.

EXAMPLE 16

300 g. of the compound mentioned in Example 12 or of its Ca salt, 273 g. of sugar, 20 g. of polyethylene glycol 4,000 and 7 g. of citric acid are homogenised and packaged in portions of 6 g. This mixture is shaken up in water before administration, and is taken orally.

What we claim is:

1. A compound selected from the group consisting of compounds of the formula

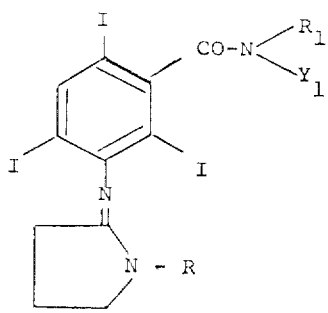

wherein $Y_1$ is —$CH_2$—COOH, —$(CH_2)_2$—COOH, $CH_2$—CH($CH_3$)—COOH or $CH_2$—CH($C_2H_5$)—COOH, R is methyl, ethyl, cyclohexyl, β-hydroxyethyl, β-methoxyethyl, γ-methoxypropyl or phenyl and $R_1$ is hydrogen, methyl, ethyl, propyl, allyl or γ-methoxypropyl, alkyl esters thereof wherein the alkyl group contains 1 to 4 carbon atoms and pharmaceutically acceptable salts thereof with bases.

2. A compound according to claim 1, which is a pharmaceutically acceptable salt with a mineral acid or organic acid.

3. A compound according to claim 1, selected from the group consisting of compounds of the formula

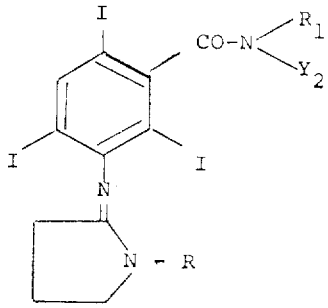

wherein $Y_2$ is —$CH_2$—$CH_2$—COOH, —$CH_2$—CH($CH_3$)—COOH or —$CH_2$—CH($C_2H_5$)—COOH, R is β-hydroxyethyl and $R_1$ is methyl, ethyl, propyl, allyl or γ-methoxypropyl, alkyl esters thereof wherein the alkyl group contains 1 to 4 carbon atoms and pharmaceutically acceptable salts thereof with bases.

4. A compound according to claim 1, which is a pharmaceutically acceptable salt of a compound of the formula

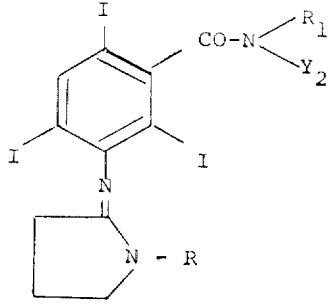

wherein $Y_2$ is —$CH_2$—$CH_2$—COOH, —$CH_2$—CH($CH_3$)—COOH or —$CH_2$—CH($C_2H_5$)—COOH, R is β-hydroxyethyl and $R_1$ is hydrogen.

5. A compound according to claim 1, selected from the group consisting of N-[3-(1'-β'-Methoxyethyl-pyrrolidinylidene-(2')-amino)-2,4,6-triiodobenzoyl]-β-aminopropionic acid and the sodium salt thereof.

6. A compound according to claim 1, selected from the group consisting of N-[3-(1'-Ethyl-pyrrolidinylidene-(2')-amino)-2,4,6-triiodobenzoyl]-β-amino-α-methylpropionic acid and the sodium salt thereof.

7. A compound according to claim 1, selected from the group consisting of N-[3-(1'-β'-Hydroxyethyl-pyrrolidinylidene-(2')-amino)-2,4,6-triiodobenzoyl]-N-allyl-β-aminopropionic acid and the sodium salt thereof.

8. A compound according to claim 1, selected from the group consisting of N-[3-(1'-γ'-Methoxypropyl-pyrrolidinylidene-(2')-amino)-2,4,6-triiodobenzoyl]-β-amino-α-methylpropionic acid and the sodium salt thereof.

9. A compound according to claim 1, selected from the group consisting of N-[3-(1'-γ'-Methoxypropyl-pyrrolidinylidene-(2')-amino)-2,4,6-triiodobenzoyl]-N-γ'-methoxypropyl-β-aminopropionic acid and the sodium salt thereof.

10. A compound according to claim 1, selected from the group consisting of N-[3-(1'-γ'-Methoxypropyl-pyrrolidinylidene-(2')-amino)-2,4,6-triiodobenzoyl]-β-aminopropionic acid and the sodium salt thereof.

11. The compound according to claim 1, sodium salt of N-[3-(1'-β'-hydroxyethyl-pyrrolidinylidene-(2')-amino)-2,4,6-triiodobenzoyl]-β-amino-α-methylpropionic acid.

12. The compound according to claim 1, sodium salt of N-[3-(1'-β'-hydroxyethyl-pyrrolidinylidene-(2')-amino)-2,4,6-triiodobenzoyl]-β-aminopropionic acid.

* * * * *